(12) United States Patent
Zeine et al.

(10) Patent No.: US 11,656,347 B2
(45) Date of Patent: May 23, 2023

(54) ENVIRONMENT SENSING USING WIRELESS POWER TRANSMISSION AND A NEURAL NETWORK

(71) Applicant: Ossia Inc., Redmond, WA (US)

(72) Inventors: Ayman Hatem Zeine, Bellevue, WA (US); Hatem Ibrahim Munir Zeine, Woodinville, WA (US)

(73) Assignee: Ossia Inc., Redmond, WA (US)

( * ) Notice: Subject to any disclaimer, the term of this patent is extended or adjusted under 35 U.S.C. 154(b) by 364 days.

(21) Appl. No.: 16/828,754

(22) Filed: Mar. 24, 2020

(65) Prior Publication Data

US 2020/0336023 A1 Oct. 22, 2020

Related U.S. Application Data

(60) Provisional application No. 62/836,785, filed on Apr. 22, 2019.

(51) Int. Cl.
| | |
|---|---|
| *G01S 13/08* | (2006.01) |
| *H02J 50/90* | (2016.01) |
| *G06N 3/08* | (2023.01) |
| *G06N 3/04* | (2023.01) |
| *G01S 7/41* | (2006.01) |
| *H02J 50/20* | (2016.01) |
| *H02J 50/60* | (2016.01) |
| *H02J 50/80* | (2016.01) |

(52) U.S. Cl.
CPC .............. *G01S 13/08* (2013.01); *G01S 7/417* (2013.01); *G06N 3/0445* (2013.01); *G06N 3/08* (2013.01); *H02J 50/20* (2016.02); *H02J 50/60* (2016.02); *H02J 50/80* (2016.02); *H02J 50/90* (2016.02)

(58) Field of Classification Search
CPC .. H02J 50/20; H02J 50/60; H02J 50/80; H02J 50/90; G01S 13/08; G01S 7/417; G06N 3/0445; G06N 3/08; H04B 7/086; H04B 7/088
USPC ........................................................ 702/159
See application file for complete search history.

(56) References Cited

U.S. PATENT DOCUMENTS

2020/0162980 A1* 5/2020 Kalkunte .............. H04W 16/28

* cited by examiner

*Primary Examiner* — Phuoc H Doan

(74) *Attorney, Agent, or Firm* — Amin, Turocy & Watson, LLP

(57) ABSTRACT

Various wireless power transmission systems are provided for sensing an environment, e.g., using a neural network. For instance, phase information corresponding to wireless power transmission is input into a neural network framework, and then, distance information representative of a distance from a wireless power transmitter to an object is obtained as output from the neural network framework. Based on the distance information, a power of a subsequent wireless power transmission can be modified, or an environment comprising the object can be mapped.

20 Claims, 16 Drawing Sheets

ENVIRONMENT SENSING USING WIRELESS POWER TRANSMISSION AND A NEURAL NETWORK

RELATED APPLICATION

The subject patent application claims priority to U.S. Provisional Patent Application No. 62/836,785, filed Apr. 22, 2019 and entitled "ENVIRONMENT SENSING USING WIRELESS POWER TRANSMISSION AND A NEURAL NETWORK," the entirety of which application is hereby incorporated by reference herein.

TECHNICAL FIELD

The subject disclosure generally relates to embodiments corresponding to a wireless power transmission system for sensing an environment.

BACKGROUND

Directed antenna systems can transmit wireless power over radio frequency (RF) signals to various devices coupled to a wireless power receiver, which provides for wireless power over relatively long distances compared to the short electromagnetic field distances needed for inductive charging-type systems. In general, a wireless transmission device sends RF signals from an array of one or more antenna elements/transceivers acting as transmitters to the wireless power receiver. The wireless power receiver comprises an antenna (one or more antenna elements) and circuitry that converts the received RF signals into power.

In general, the wireless transmission device transmits a wireless beacon signal that is reflected back to wireless transceivers. Based on the received phases and the amplitudes of the reflected signals, the wireless transmission device can determine various information comprising inverted phases, complex conjugate phases and so forth. The wireless transmission device uses this phase-based information to determine paths to transmit the RF power signals to a wireless power receiving device, that is, paths that avoid person(s) or other object(s) that can undesirably absorb the RF power signal.

BRIEF DESCRIPTION OF THE DRAWINGS

Non-limiting embodiments of the subject disclosure are described with reference to the following figures, wherein like reference numerals refer to like parts throughout the various views unless otherwise specified:

FIG. 4 is a representation of using estimated distance information to control wireless power output in real time, in accordance with various example embodiments of the subject matter disclosed herein.

DETAILED DESCRIPTION

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Reference throughout this specification to "one embodiment," "an embodiment," etc. means that a particular feature, structure, or characteristic described in connection with the embodiment is included in at least one embodiment. Thus, the appearances of the phrase "in one embodiment," "in an embodiment," etc. in various places throughout this specification are not necessarily all referring to the same embodiment. Furthermore, the particular features, structures, or characteristics may be combined in any suitable manner in one or more embodiments.

While the use of phase information to select power transmission paths is highly desirable, it is also desirable to know the distance to the wireless receiver, which can change as the wireless receiver is moved. In general, if the distance is known, the distance information can be used to control the power of the wireless transmission device, generally to reduce stray power. For example, if the wireless power receiver is known to be too close to the wireless transmission device, then power can be reduced, including to zero (turned off) if desired, because at too close a distance a person can be exposed to the power transmission. Power can be re-increased as appropriate. As another example, if the wireless power receiver is going out of range of the wireless transmission device, then the wireless transmission device and the wireless power receiver can negotiate shutting off further power transmissions. Still further, different antenna elements can be turned on while others are turned off based on such distance information.

Described herein is a way to use the phase information of the reflected beacon signal to estimate distance information. To this end, a neural network technology (e.g., a trained convolutional neural network framework) is used as described herein, where a convolutional neural network is a type of neural network that specializes in image-type analysis tasks by applying layers of filters/convolutions to input data to obtain feature data and regress to a correct output. Note that the distance information can be output in conventional units such as centimeters, or can be output in other ways, such as within range or out-of-range, or within a close distance, within a medium distance, within a far distance, out-of-range and so forth.

Figure 1:
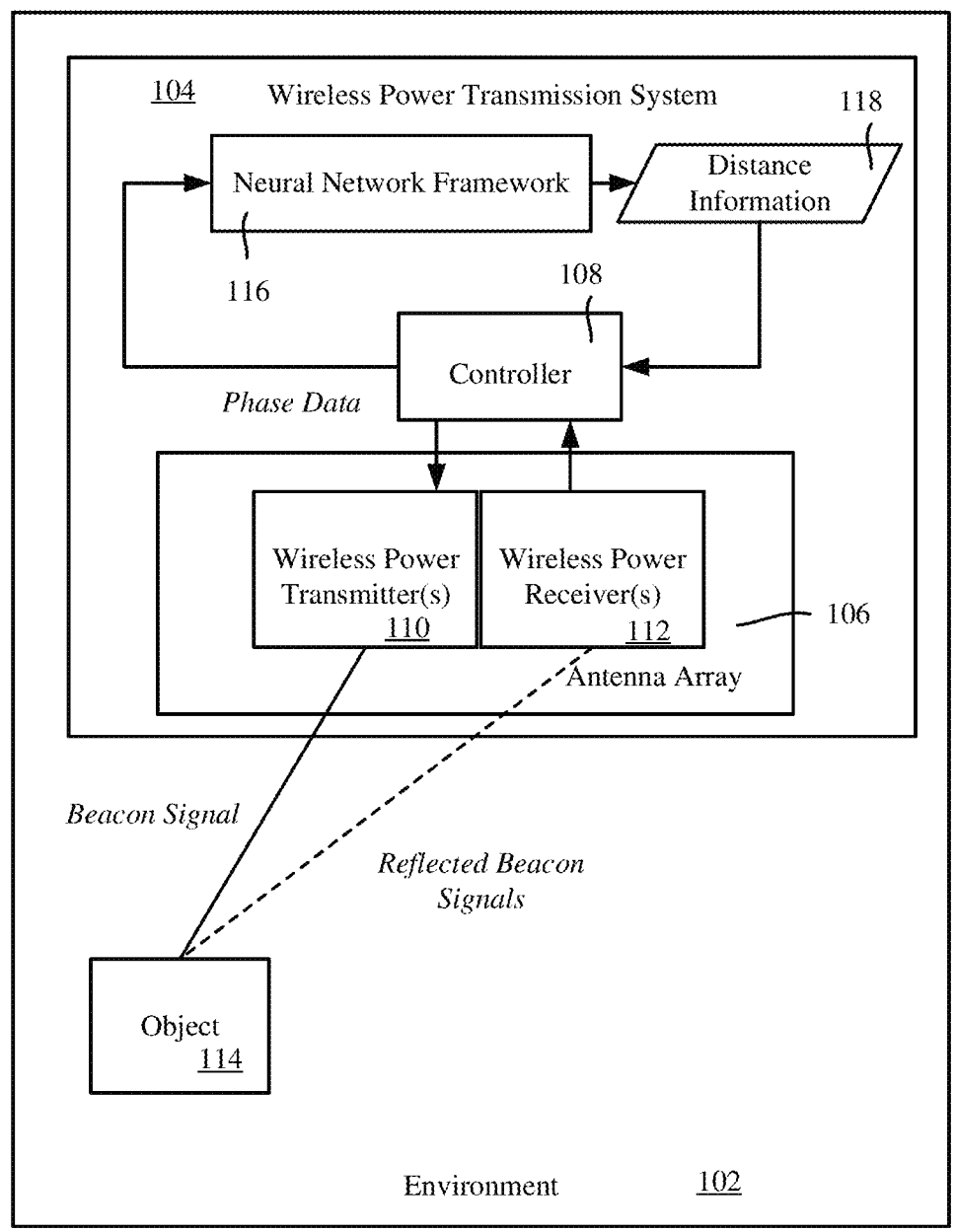
FIG. 1 is representation of a wireless power transmission system including a neural network framework used to determine distance information in an environment, in accordance with various example embodiments of the subject matter disclosed herein.

FIG. 1 shows an example environment 102 comprising a wireless power transmission system 104. The wireless power transmission system 104 is sometimes referred to as a "tile," because such as system can be implemented in a ceiling tile, for example.

In general, the wireless power transmission system 104 comprises transceivers coupled to an antenna array 106 of antenna elements, with the transceivers managed by a controller 108 or the like to transmit or receive, as represented by wireless power transmitter(s) 110 and wireless power receiver(s) 112. Moreover, the properties of a transmission can be controlled, such as power/amplitude, frequency, timing and so forth. In this way, phase data from beacon transmissions that are reflected back from of an object 114 (a person, a wireless receiver, a table, a book and so on) as well as reflected back from the boundaries of the environment 102 can be captured and processed as desired.

As described herein, the phase data is input into a neural network framework 116 (comprising one or more trained neural network models), which estimates the distance information 118. In one or more implementations, the neural network framework 116 can be loaded into the wireless power transmission system 104 (e.g., a tile) and executed in real time each time phase data is captured.

The distance information 118 can be used in various ways, including fed back into the controller 108 to control the power levels of subsequent RF power transmissions along chosen paths.

In addition to control transmission power of the RF power signals, the sensed distance information described can be used in other ways, including to map an environment, such as comprising objects and people in a room, any active power receivers, obstructions and so forth. Note that for mapping, a separate, independent active power receiver in the environment is not needed, as a receiver can be implemented in one of the antenna elements of the wireless power transmission system 104. Further note that mapping can be done even without lighting, unlike awkward visible light camera(s) and computer vision technologies that attempt to map an environment.

Moreover, the wireless power transmission system 104 can alternate which of its antenna is currently a receiver and which other antennas (or all others) are transmitters. By way of example, if there are N antenna elements/transceivers in a wireless power transmission system, transmission can be controlled to transmit from a selected first group of N−1 transmitters to a selected one receiver. When the data including distance information is captured, a second set comprising a different receiver and different group of N−1 transmitters is selected, and the process repeated. Based on the various captured data, the environment can be mapped. The use of such multiple transmissions and the controlled selection of receivers/sensors, can provide a relatively detailed mapping of an environment, particularly when high frequencies are used.

Note that it is also feasible to use received signal strength (e.g., amplitude) information to verify the distance information. For example, received signal strength information can be used in conjunction with distance information; e.g., if the reflected amplitude to a mapped object is lower than expected (relative to a highly reflective object) at a known distance, then it is known that the material of the object absorbed some of the mapping signal.

Figure 2:
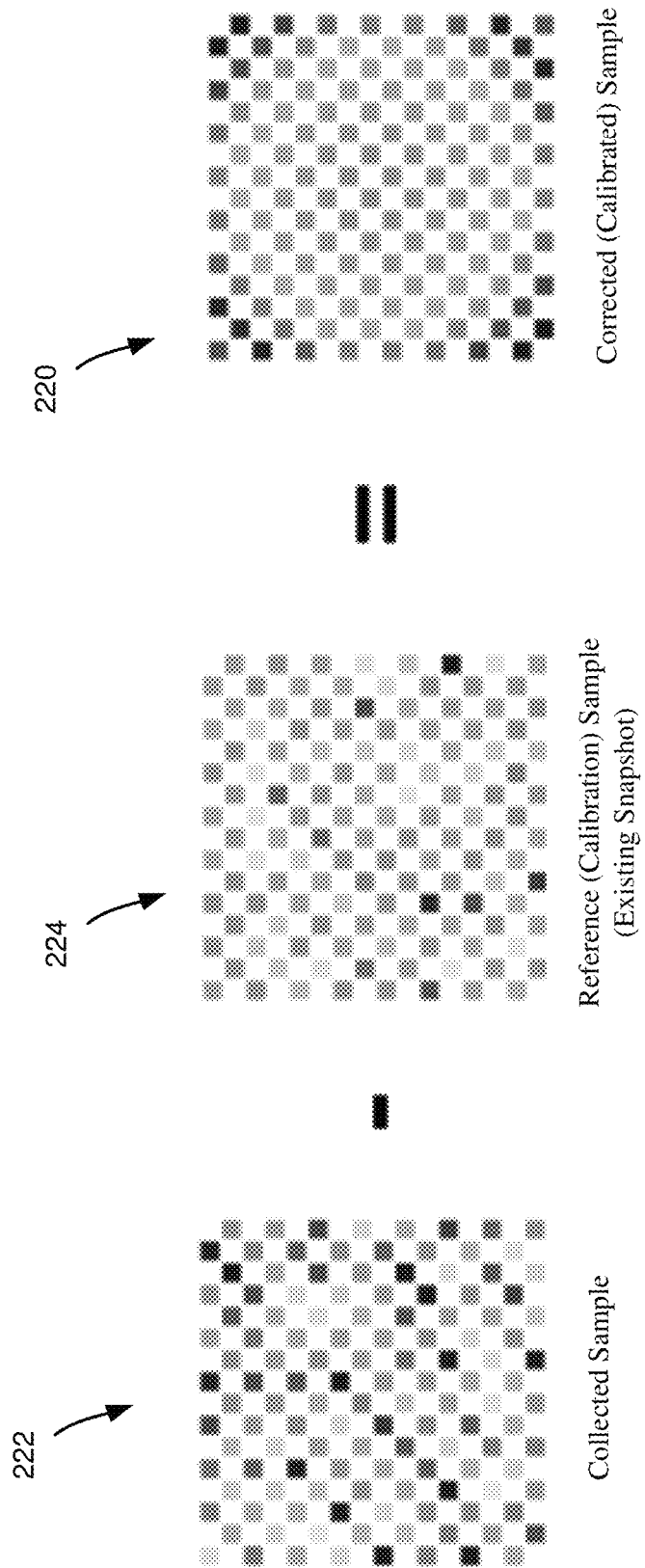
FIG. 2 is a representation of obtaining a corrected sample from a collected sample 222 based on a reference (calibration) sample, in accordance with various example embodiments of the subject matter disclosed herein.

In general and as represented in FIG. 2, corrected (calibrated) samples such as the sample 220 are used as inputs for the neural network. To obtain a corrected (calibrated) sample 220, a newly collected sample 222 is captured by a wireless power receiver/sensor. A reference (calibration) sample 224, which was calculated at a first sample collection, is subtracted from the collected sample 222, providing the corrected sample 220. In one or more implementations, the collected samples that are used as the basis for the corrected input samples are collected 30 times per second.

More particularly, a process operates to capture an initial (reference) phase sample. The process then subtracts the value of a reference antenna by all the antenna values, resulting in the calibration sample. Preserving the calibration sample, the process then subtracts each of the corresponding antenna phase values from the incoming samples. The result of such antenna-by-antenna subtraction yields a corrected phase sample.

In one or more implementations, the neural network framework 116 (FIG. 1) comprises a distance estimation (neural network) model. The model performs a multi-variate linear regression, in which given a set of input phase information, the phase calibration neural network outputs a corrected version of the phase data, which is used to encode features that describe the end result.

Figure 3:
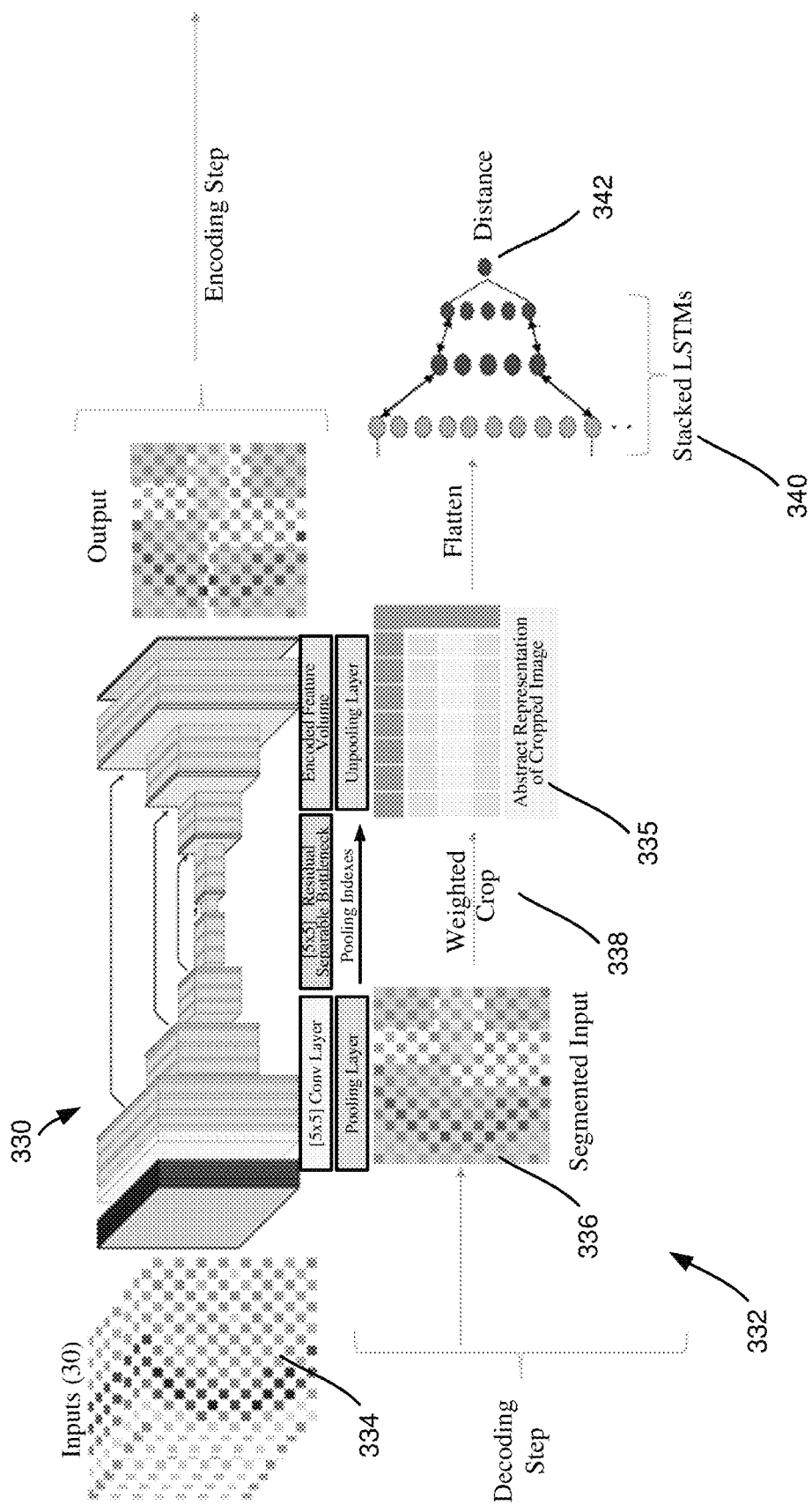
FIG. 3 is a representation of a neural network that inputs samples to produce distance information via encoding and decoding operations, in accordance with various example embodiments of the subject matter disclosed herein.

More particularly, via semantic segmentation as represented in FIG. 3, features of the input samples are encoded and preserved, such that the image can be reconstructed with (abstract) labeled regions of interest (RoI) that the model uses to more accurately determine the distance, even if there is an obstruction between the tile and receiver, or reflected phases on the tile. The neural network also implements LSTM layers (Long-Short Term Memory), introducing an internal state in the neural network such that it can evaluate a time-series of input phases and evaluate distance accurately in real time. This is somewhat similar to that of applying a neural network on a video stream and having it detect different objects in space.

The distance estimation neural network inputs the corrected version of the phase data, where correction is described above with reference to FIG. 2. In one or more implementations, the distance estimation neural network comprises a convolutional neural network responsible for estimating the distance to an object from the transmitter, using the recorded phase data (after correction) on each transmitting antenna. This neural network can implement a univariate regression task given a set of input phase information.

In general, a neural network has different types of layers that are used to extract different types of information from the given data. Convolutional layers discover the cross-correlations or co-occurrences of various kinds in the data. Max pooling layers capture and preserve the highest values in a sample (about twenty-five percent of the data), and discard data deemed unimportant/irrelevant. Fully connected layers connect the neurons together, allowing for signal mixing, which enables the model to "generalize" the learned information. Upsampling layers interpolate the "generalized" encoded layer units and create a larger denoised decoded version of the sample.

As represented in FIG. 3, one embodiment of the neural network can have two general parts, comprising an encoding step 330 and a decoding step 332. Semantic segmentation occurs in the encoding step 330, which processes the input images 334, and for each input image creates an abstract corrected representation 335 of the sample 336. To this end, this sample 336 is then processed in the decoding step 332.

More particularly, in the decoding step 332, a weighted crop 338 is applied on the processed sample such that the neural network can learn to determine the distance using smaller patches of information from a single sample. The cropped images then are represented in a single array of units (fully connected layer) and inputted into LSTM layers 340. The LSTM layers 340 develop the neural network's ability to have a 'stateful understanding' of the real time information, because of the time-series of sample input images 334 being inputted. The LSTM layers 340 are then output to a single unit output, being the distance 342.

Figure 4:
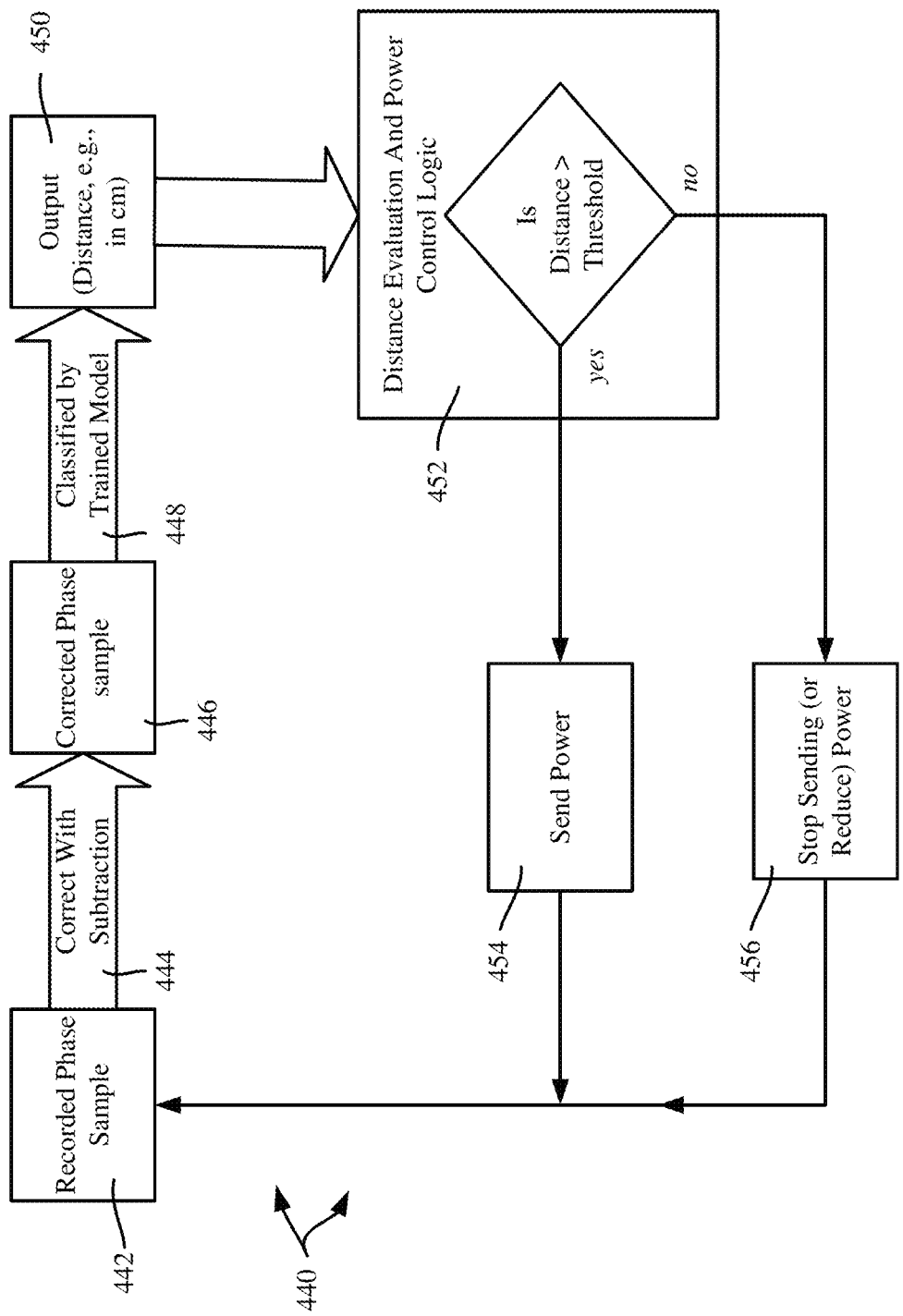
FIG. 4 is a representation of a pipeline that uses a trained model to determine distance information based on phase information, in accordance with various example embodiments of the subject matter disclosed herein.

FIG. 4 shows an implementation of a pipeline 440 in which a recorded input phase sample 442 is corrected with subtraction (arrow 444) as described herein, resulting in a corrected phase sample 446. The corrected phase sample 446 is classified by the trained model (arrow 448), which results in distance information as output 450, such as in centimeters in this example.

In the example of FIG. 4, the output 450 is fed into distance evaluation and power control logic 452, which evaluates the distance information against a threshold distance value, such as one meter. If greater than the threshold distance value, the distance evaluation and power control logic 452 controls the wireless power transmitter to send power to the wireless power receiver (block 452). Otherwise, the distance evaluation and power control logic 452 controls the transmitter such that power is not sent (block 454). Note that in one alternative, the power output level can be increased or reduced based on the distance output 450; for example, the distance evaluation logic can control the transmitter to send a regular power level at a distance of two meters, to send half power between two meters and one meter, and to not send any power (reduce power to zero) below one meter. As can be readily appreciated, even more fine-grained power control can be implemented.

Turning to training the neural network, labeled training data is used. In one implementation, empirically recorded data is used in the training. Note that additional data can be generated from the recorded data by rotating the image, adding various types of noise, etc.

In one or more implementations, the dataset can be split into three parts, namely training, testing, and validation. Typically the highest percentage of the dataset is used for training, which is used to develop the neural network weights to fit the given data. Validation data, typically the lowest percentage of the dataset, is used to simulate the neural network's performance on unseen data. The testing data is used to test the neural network's performance on unseen data.

Figure 5A:
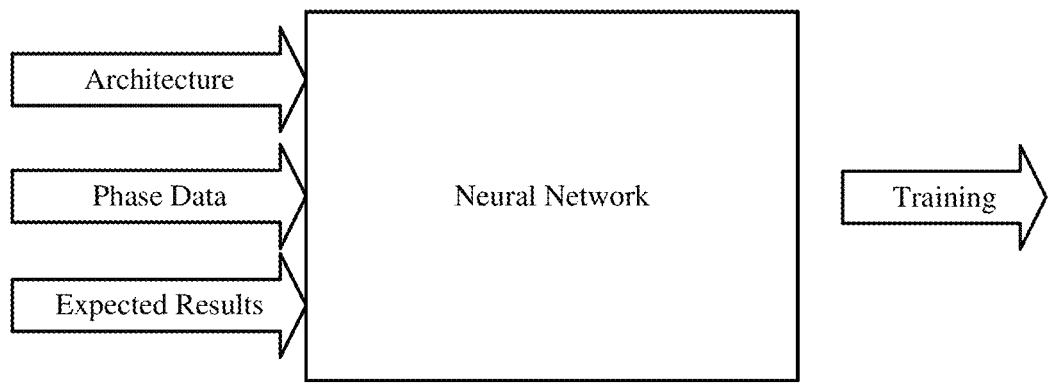
FIGS. 5A and 5B illustrate an example of training a distance estimation model (FIG. 6A) for use in outputting a result based on input phase data (FIG. 6B), in accordance with various example embodiments of the subject matter disclosed herein.
Figure 5B:
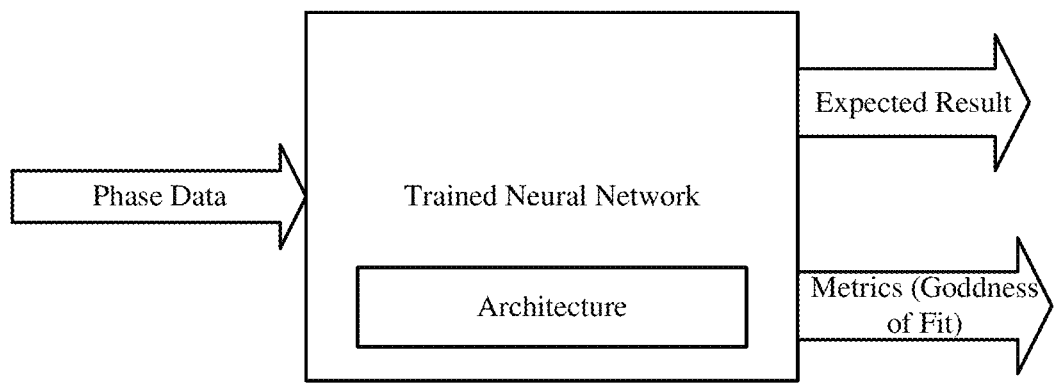

As represented in FIG. 5A, inputs comprise the architecture (layer information) as the configuration information, the phase data (the phase data corresponding to the labeled training data) and the expected results. As represented in FIG. 5B, once trained, the architecture is part of the trained neural network, and when phase data is input, an expected result (the distance information) is output, along with metrics (e.g., goodness of fit).

Equation coefficients are learned and output, along with metrics. Once learned, the equation coefficients are part of the trained neural network, and when recorded data is input, corrected data is output.

Figure 6:
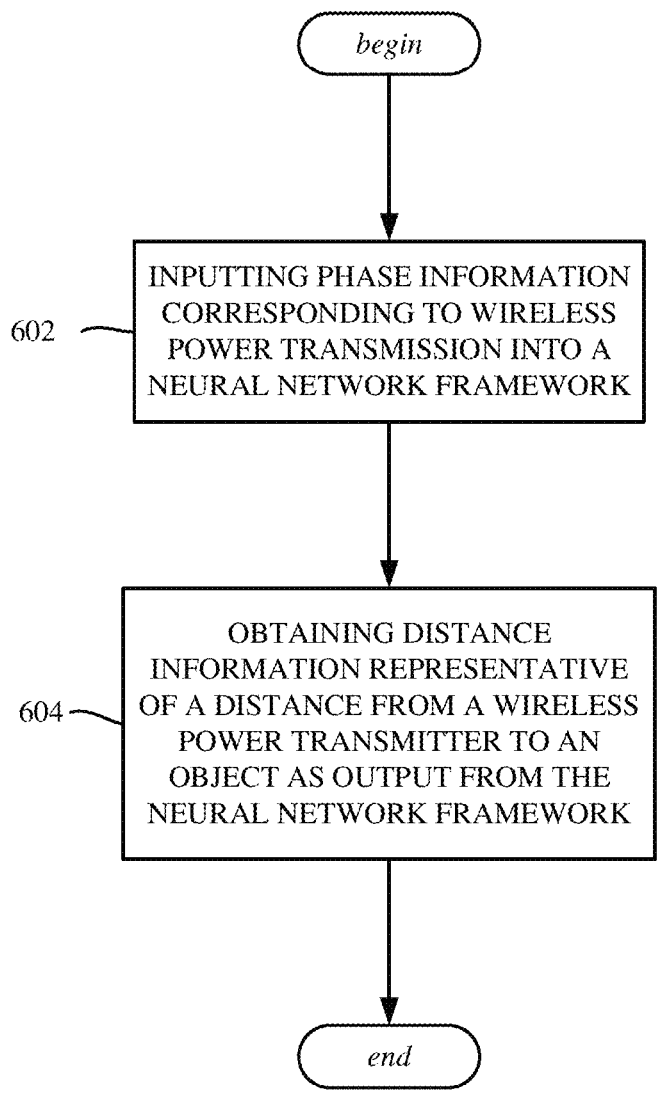
FIG. 6 illustrates a flow diagram showing example operations with respect to obtaining distance information based on phase information input into a neural network framework, in accordance with various example embodiments of the subject matter disclosed herein.

One or more aspects of the technology described herein, such as corresponding to operations of a method, are represented in FIG. 6. Operation 602 represents inputting phase information corresponding to wireless power transmission into a neural network framework. Operation 604 represents obtaining distance information representative of a distance from a wireless power transmitter to an object as output from the neural network framework.

Obtaining the distance information representative of the distance from the wireless power transmitter to the object can comprise obtaining the distance information representative of the distance from the wireless power transmitter to a wireless power receiver.

Obtaining the distance information representative of the distance from the wireless power transmitter to the object can comprise obtaining reflected distance information representative of the distance from the wireless power transmitter to the object and back to a wireless receiver adjacent the wireless power transmitter.

Aspects can comprise modifying power of a subsequent wireless power transmission based on the distance information. Aspects can comprise mapping an environment comprising the object based on the distance information. Aspects can comprise obtaining signal strength information corresponding to the wireless power transmission, and using the signal strength information to verify the distance information.

Aspects can comprise transmitting signals to produce the phase information via an array of transmitting antennas, and receiving the signals at a receiving antenna. Aspects can comprise transmitting signals to produce the phase information via an antenna array comprising transmitting antennas and a receiving antenna that receives the signals. The phase information can comprise first phase information and second phase information; aspects can comprise transmitting first signals in a first operation via a first transmission group of transmitting antennas to a first receiving antenna of an antenna array, the first signals being received at the first receiving antenna to obtain the first phase information, changing to a second receiving antenna of the antenna array that is different from the first receiving antenna, and changing the first transmission group of the antenna array to a second transmission group of transmitting antennas that is different from the first group, and transmitting second signals in a second operation via the second transmission group of transmitting antennas to the second receiving antenna of the antenna array, the second signals being received at the second receiving antenna to obtain the second phase information. Aspects can comprise training the neural network framework using supervised learning.

Figure 7:
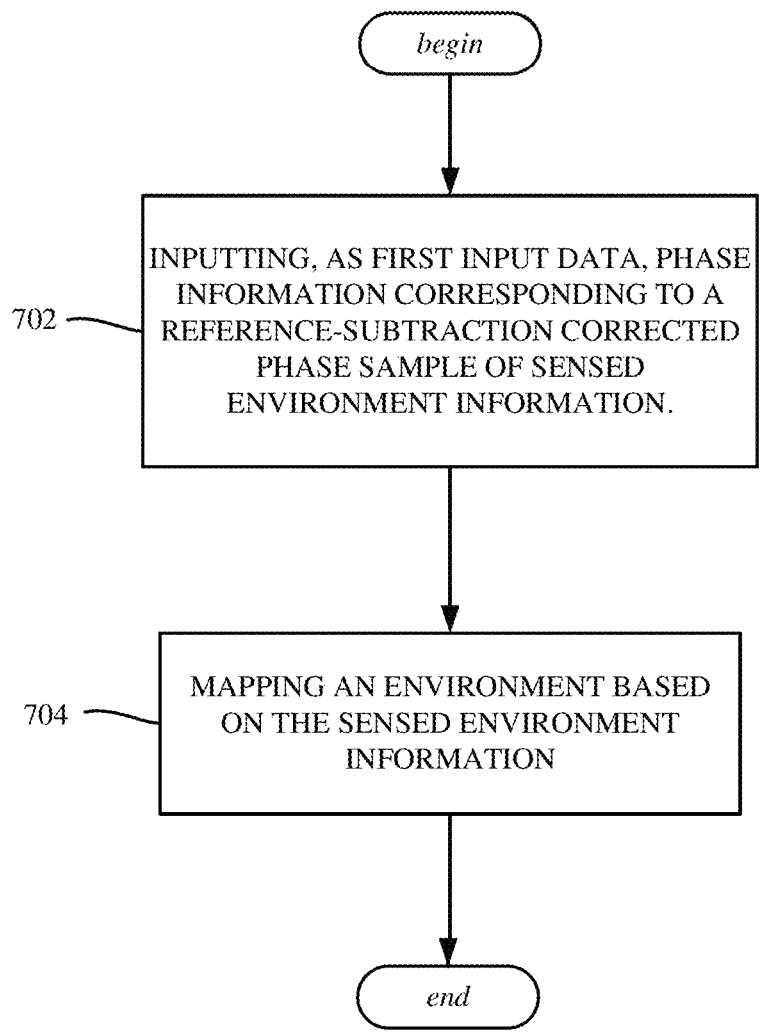
FIG. 7 illustrates a flow diagram showing example operations with respect to mapping an environment based on phase information, in accordance with various example embodiments of the subject matter disclosed herein.

One or more aspects of the technology described herein, such as corresponding to operations of a method, are represented in FIG. 7. Operation 702 represents inputting, as first input data, phase information corresponding to a reference-subtraction corrected phase sample of sensed environment information. Operation 704 represents mapping an environment based on the sensed environment information.

The sensed environment information can comprise distance information. Aspects can comprise performing semantic segmentation to encode the input data to return a recreated sample as an abstract representation for evaluating regions and time-series elements of the recreated sample.

Figure 8:
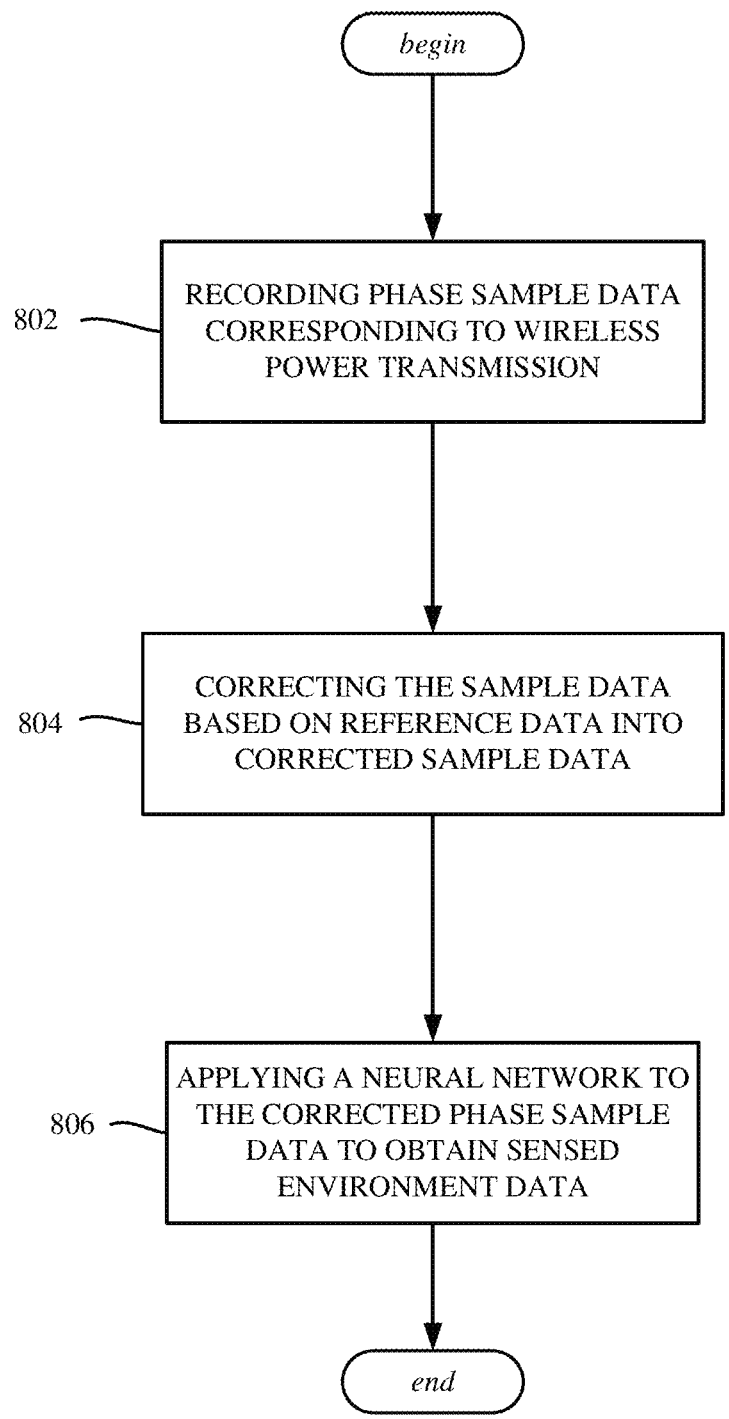
FIG. 8 illustrates a flow diagram showing example operations with respect to obtaining sensed environment data based on recorded phase information that is corrected into corrected phase sample data, which is used as input into a neural network (distance estimation model) to obtain sensed environmental data, in accordance with various example embodiments of the subject matter disclosed herein.

One or more aspects of the technology described herein, such as corresponding to operations of a method, are represented in FIG. 8. Operation 802 represents recording phase sample data corresponding to wireless power transmission. Operation 804 represents correcting the sample data based on reference data into corrected sample data. Operation 806 represents applying a neural network to the corrected phase sample data to obtain sensed environment data. Aspects can comprise controlling subsequent wireless power transmission based on the sensed environment data.

Figure 9:
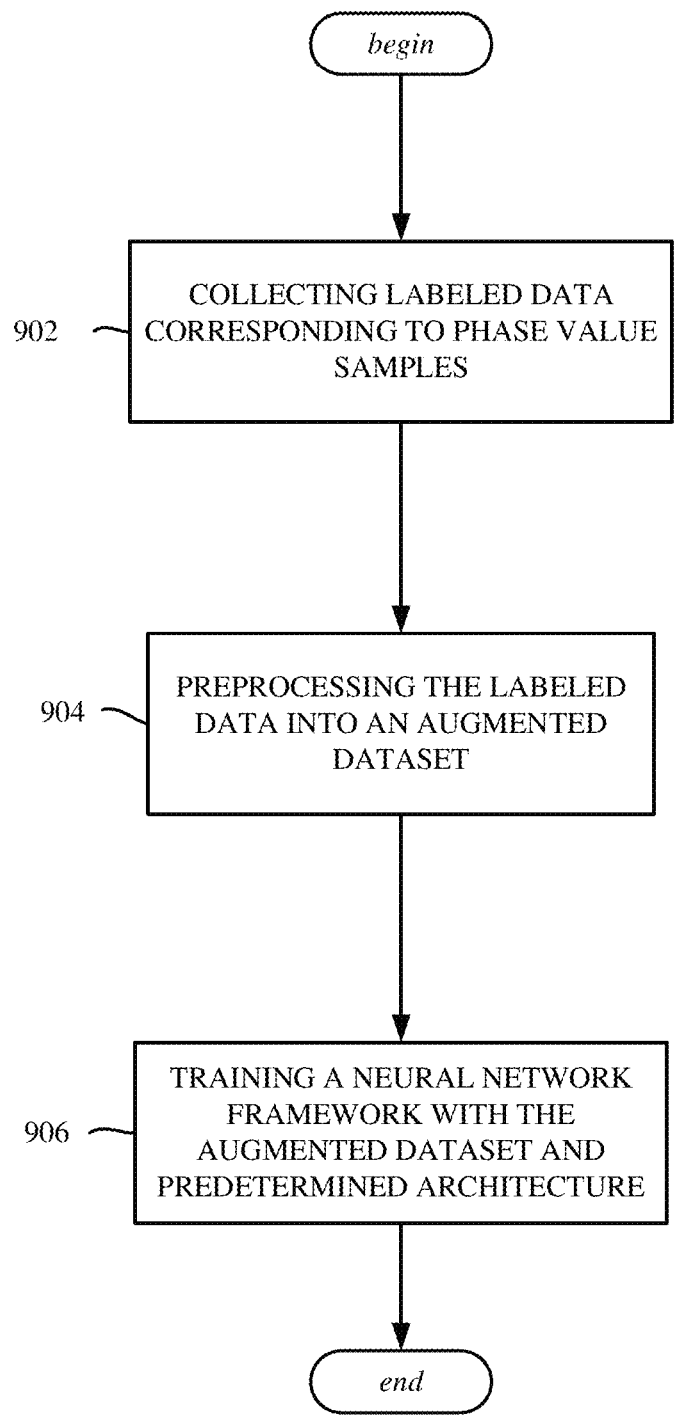
FIG. 9 illustrates a flow diagram showing example operations with respect to training a neural network framework, in accordance with various example embodiments of the subject matter disclosed herein.

One or more aspects of the technology described herein, such as corresponding to operations of a method, are represented in FIG. 9. Operation 902 represents collecting labeled data corresponding to phase value samples. Operation 904 represents preprocessing the labeled data into an augmented dataset. Operation 906 represents training a neural network framework with the augmented dataset and predetermined architecture.

Any of the above operations/methods can, for example, be performed by a system, comprising a processor and a memory that stores executable instructions that, when executed by the processor, facilitate performance of the above operations/methods. Similarly, the operations/method can be embodied on a machine-readable storage medium, comprising executable instructions that, when executed by a processor, facilitate performance of any of the above methods/operations.

As can be seen, the wireless power technology described herein that inputs phase data into a neural network framework provides for sensing an environment, such as obtaining distance information to object(s) and the like in the environment. This is useful for many applications, including for controlling the power level of wireless power transmissions.

Figure 10:
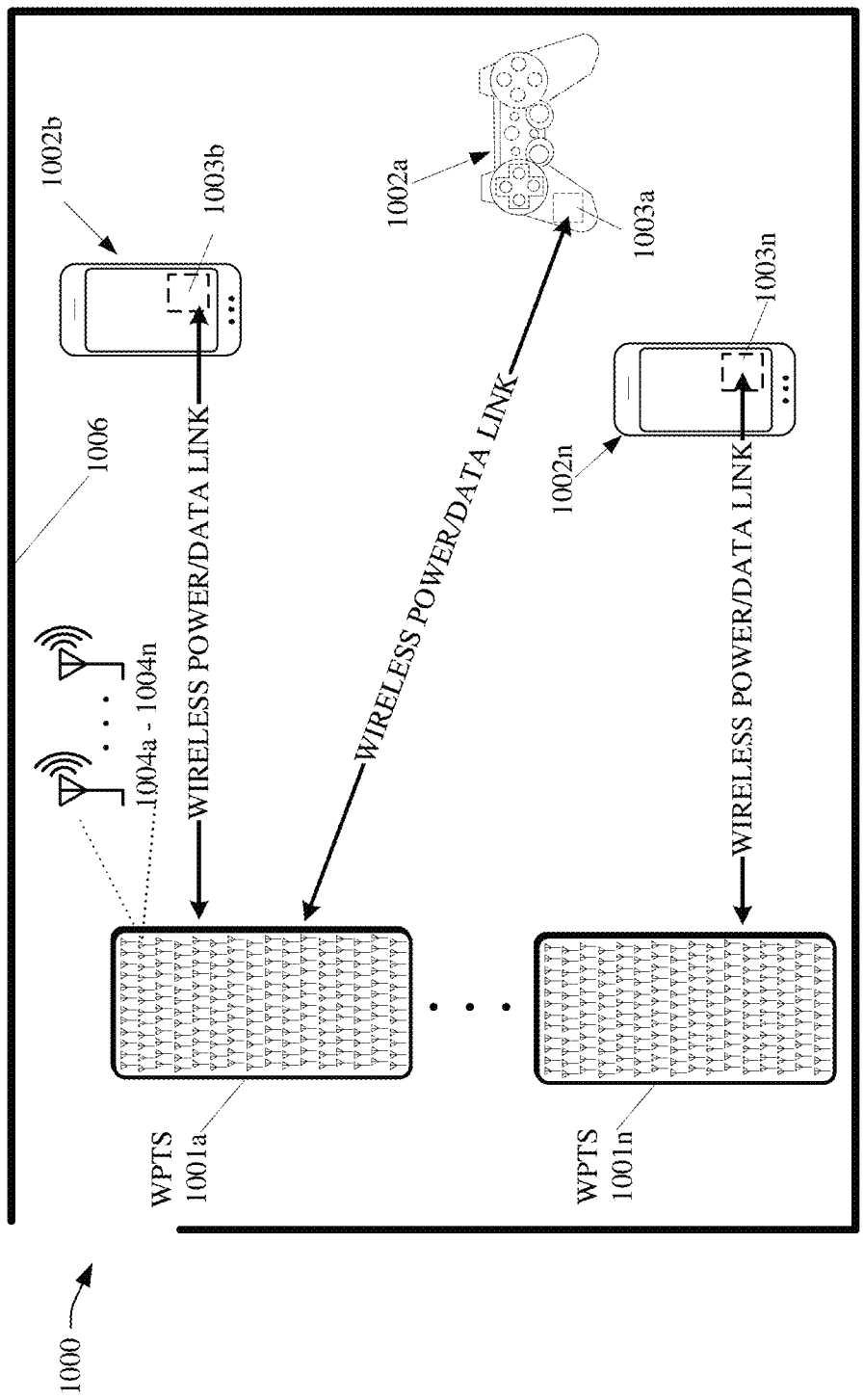
FIG. 10 depicts a block diagram of an example wireless power delivery environment illustrating wireless power delivery from one or more wireless power transmission systems to various wireless devices within the wireless power delivery environment, in accordance with various example embodiments of the subject matter disclosed herein.

FIG. 10 depicts a block diagram including an example wireless power delivery environment 1000 illustrating wireless power delivery from one or more wireless power transmission systems (WPTS) 1001a-n (also referred to as "wireless power delivery systems", "antenna array systems" and "wireless chargers") to various wireless devices 1002a-n within the wireless power delivery environment 1000, according to some embodiments. More specifically, FIG. 10 illustrates an example wireless power delivery environment 1000 in which wireless power and/or data can be delivered to available wireless devices 1002a-1002n having one or more wireless power receiver clients 1003a-1003n (also referred to herein as "clients" and "wireless power receivers"). The wireless power receiver clients are configured to receive and process wireless power from one or more wireless power transmission systems 1001a-1001n. Components of an example wireless power receiver client 1003 are shown and discussed in greater detail with reference to FIG. 13.

As shown in the example of FIG. 10, the wireless devices 1002a-1002n include mobile phone devices and a wireless game controller. However, the wireless devices 1002a-1002n can be any device or system that needs power and is capable of receiving wireless power via one or more integrated wireless power receiver clients 1003a-1003n. As discussed herein, the one or more integrated wireless power receiver clients receive and process power from one or more wireless power transmission systems 1001a-1001n and provide the power to the wireless devices 1002a-1002n (or internal batteries of the wireless devices) for operation thereof.

Each wireless power transmission system 1001 can include multiple antennas 1004a-n, e.g., an antenna array including hundreds or thousands of antennas, which are capable of delivering wireless power to wireless devices 1002a-1002n. In some embodiments, the antennas are adaptively-phased RF antennas. The wireless power transmission system 1001 is capable of determining the appropriate phases with which to deliver a coherent power transmission signal to the wireless power receiver clients 1003a-1003n. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may include related and peripheral circuitry for signal generation, reception and transmission, such as radios, digital logic and modems. In some embodiments, the wireless power transmission system 1001 can have an embedded Wi-Fi hub for data communications via one or more antennas or transceivers.

The wireless devices 1002 can include one or more wireless power receiver clients 1003. As illustrated in the example of FIG. 10, power delivery antennas 1004a-1004n are shown. The power delivery antennas 1004a are configured to provide delivery of wireless radio frequency power in the wireless power delivery environment. In some embodiments, one or more of the power delivery antennas 1004a-1004n can alternatively or additionally be configured for data communications in addition to or in lieu of wireless power delivery. The one or more data communication antennas are configured to send data communications to and receive data communications from the wireless power receiver clients 1003a-1003n and/or the wireless devices 1002a-1002n. In some embodiments, the data communication antennas can communicate via Bluetooth™, Wi-Fi, ZigBee™, etc. Other data communication protocols are also possible.

Each wireless power receiver client 1003a-1003n includes one or more antennas (not shown) for receiving signals from the wireless power transmission systems 1001a-1001n. Likewise, each wireless power transmission system 1001a-1001n includes an antenna array having one or more antennas and/or sets of antennas capable of emitting continuous wave or discrete (pulse) signals at specific phases relative to each other. As discussed above, each of the wireless power transmission systems 1001a-1001n is capable of determining the appropriate phases for delivering the coherent signals to the wireless power receiver clients 1002a-1002n. For example, in some embodiments, coherent signals can be determined by computing the complex conjugate of a received beacon (or calibration) signal at each antenna of the array such that the coherent signal is phased for delivering power to the particular wireless power receiver client that transmitted the beacon (or calibration) signal.

Although not illustrated, each component of the environment, e.g., wireless device, wireless power transmission system, etc., can include control and synchronization mechanisms, e.g., a data communication synchronization module. The wireless power transmission systems 1001a-1001n can be connected to a power source such as, for example, a power outlet or source connecting the wireless power transmission systems to a standard or primary AC power supply in a building. Alternatively, or additionally, one or more of the wireless power transmission systems 1001a-1001n can be powered by a battery or via other mechanisms, e.g., solar cells, etc.

The wireless power receiver clients 1002a-1002n and/or the wireless power transmission systems 1001a-1001n are configured to operate in a multipath wireless power delivery environment. That is, the wireless power receiver clients 1002a-1002n and the wireless power transmission systems 1001a-1001n are configured to utilize reflective objects 1006 such as, for example, walls or other RF reflective obstructions within range to transmit beacon (or calibration) signals and/or receive wireless power and/or data within the wireless power delivery environment. The reflective objects 1006 can be utilized for multi-directional signal communication regardless of whether a blocking object is in the line of sight between the wireless power transmission system and the wireless power receiver clients 1003a-1003n.

As described herein, each wireless device 1002a-1002n can be any system and/or device, and/or any combination of devices/systems that can establish a connection with another device, a server and/or other systems within the example environment 1000. In some embodiments, the wireless devices 1002a-1002n include displays or other output functionalities to present data to a user and/or input functionalities to receive data from the user. By way of example, a wireless device 1002 can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. By way of example and not limitation, the wireless device 1002 can also be any wearable device such as watches, necklaces, rings or even devices embedded on or within the customer. Other examples of a wireless device 1002 include, but are not limited to, safety sensors (e.g., fire or carbon monoxide), electric toothbrushes, electronic door lock/handles, electric light switch controller, electric shavers, etc.

Although not illustrated in the example of FIG. 10, the wireless power transmission system 1001 and the wireless power receiver clients 1003a-1003n can each include a data communication module for communication via a data channel. Alternatively, or additionally, the wireless power receiver clients 1003a-1003n can direct the wireless devices 1002a-1002n to communicate with the wireless power transmission system via existing data communications modules. In some embodiments, the beacon signal, which is primarily referred to herein as a continuous waveform, can alternatively or additionally take the form of a modulated signal.

Figure 11:
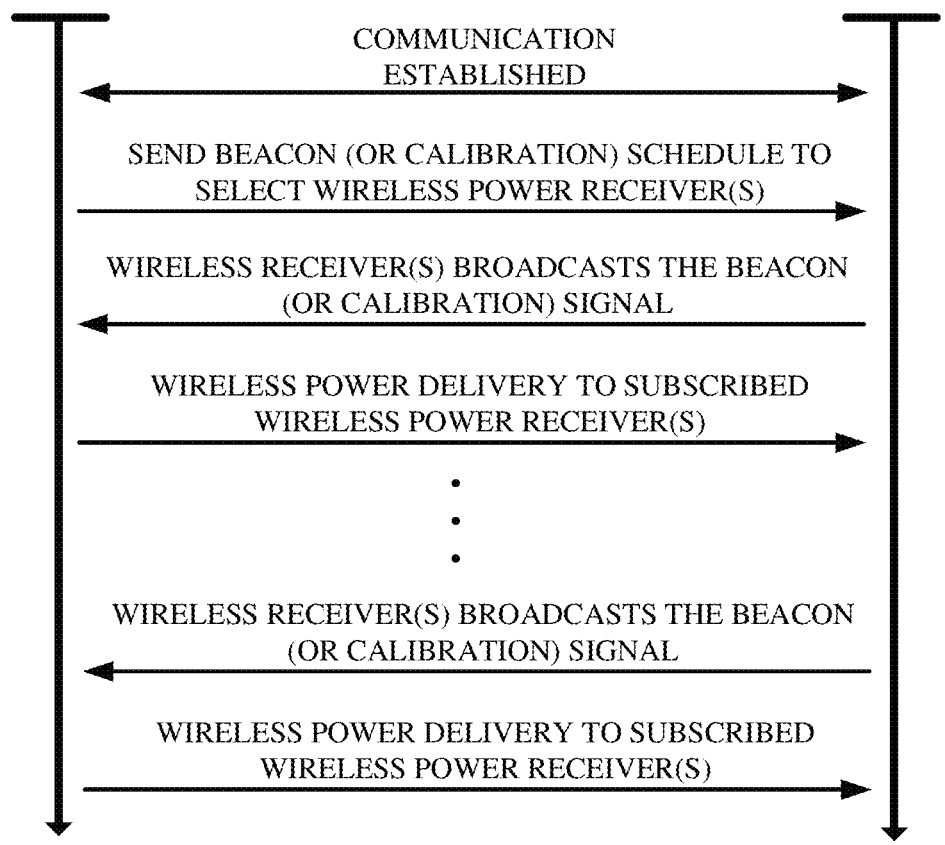
FIG. 11 depicts a sequence diagram illustrating example operations between a wireless power transmission system and a wireless power receiver client for commencing wireless power delivery, in accordance with various example embodiments of the subject matter disclosed herein.

FIG. 11 depicts a sequence diagram 1100 illustrating example operations between a wireless power delivery system (e.g., wireless power transmission system 1001 of FIG. 10) and a wireless power receiver client (e.g., FIG. 13) for establishing wireless power delivery in a multipath wireless power delivery, according to an embodiment. Initially, communication is established between the wireless power delivery system and the power receiver client. The initial communication can be, for example, a data communication link that is established via one or more antennas (e.g., 1004a-1004n) of the wireless power transmission system. As discussed, in some embodiments, one or more of the antennas can be data antennas, wireless power transmission antennas, or dual-purpose data/power antennas. Various information can be exchanged between the wireless power transmission system and the wireless power receiver client over this data communication channel. For example, wireless power signaling can be time sliced among various clients in a wireless power delivery environment. In such cases, the wireless power transmission system can send beacon schedule information, e.g., Beacon Beat Schedule (BBS) cycle, power cycle information, etc., so that the wireless power receiver client knows when to transmit (broadcast) its beacon signals and when to listen for power, etc.

Continuing with the example of FIG. 11, the wireless power transmission system selects one or more wireless power receiver clients for receiving power and sends the beacon schedule information to the selected wireless power receiver clients. The wireless power transmission system can also send power transmission scheduling information so that the wireless power receiver client knows when to expect (e.g., a window of time) wireless power from the wireless power transmission system. The wireless power receiver client then generates a beacon (or calibration) signal and broadcasts the beacon during an assigned beacon transmission window (or time slice) indicated by the beacon schedule information, e.g., BBS cycle. As discussed herein, the wireless power receiver client includes one or more antennas (or transceivers) that have a radiation and reception pattern in three-dimensional space proximate to the wireless device in which the wireless power receiver client is embedded.

The wireless power transmission system receives the beacon from the power receiver client and detects and/or otherwise measures the phase (or direction) from which the beacon signal is received at multiple antennas. The wireless power transmission system then delivers wireless power to the power receiver client from the multiple antennas based on the detected or measured phase (or direction) of the received beacon at each of the corresponding antennas. In some embodiments, the wireless power transmission system determines the complex conjugate of the measured phase of the beacon and uses the complex conjugate to determine a transmit phase that configures the antennas for delivering and/or otherwise directing wireless power to the wireless power receiver client via the same path over which the beacon signal was received from the wireless power receiver client.

In some embodiments, the wireless power transmission system includes many antennas. One or more of the many antennas may be used to deliver power to the power receiver client. The wireless power transmission system can detect and/or otherwise determine or measure phases at which the beacon signals are received at each antenna. The large number of antennas may result in different phases of the beacon signal being received at each antenna of the wireless power transmission system. As discussed above, the wireless power transmission system can determine the complex conjugate of the beacon signals received at each antenna. Using the complex conjugates, one or more antennas may emit a signal that takes into account the effects of the large number of antennas in the wireless power transmission system. In other words, the wireless power transmission system can emit a wireless power transmission signal from one or more antennas in such a way as to create an aggregate signal from the one or more of the antennas that approximately recreates the waveform of the beacon in the opposite direction. Said another way, the wireless power transmission system can deliver wireless RF power to the wireless power receiver clients via the same paths over which the beacon signal is received at the wireless power transmission system. These paths can utilize reflective objects 1006 within the environment. Additionally, the wireless power transmission signals can be simultaneously transmitted from the wireless power transmission system such that the wireless power transmission signals collectively match the antenna radiation and reception pattern of the client device in a three-dimensional (3D) space proximate to the client device.

As shown, the beacon (or calibration) signals can be periodically transmitted by wireless power receiver clients within the power delivery environment according to, for example, the BBS, so that the wireless power transmission system can maintain knowledge and/or otherwise track the location of the power receiver clients in the wireless power delivery environment. The process of receiving beacon signals from a wireless power receiver client at the wireless power transmission system and, in turn, responding with wireless power directed to that particular wireless power receiver client is referred to herein as retrodirective wireless power delivery.

Furthermore, as discussed herein, wireless power can be delivered in power cycles defined by power schedule information. A more detailed example of the signaling required to commence wireless power delivery is described now with reference to FIG. 12.

Figure 12:
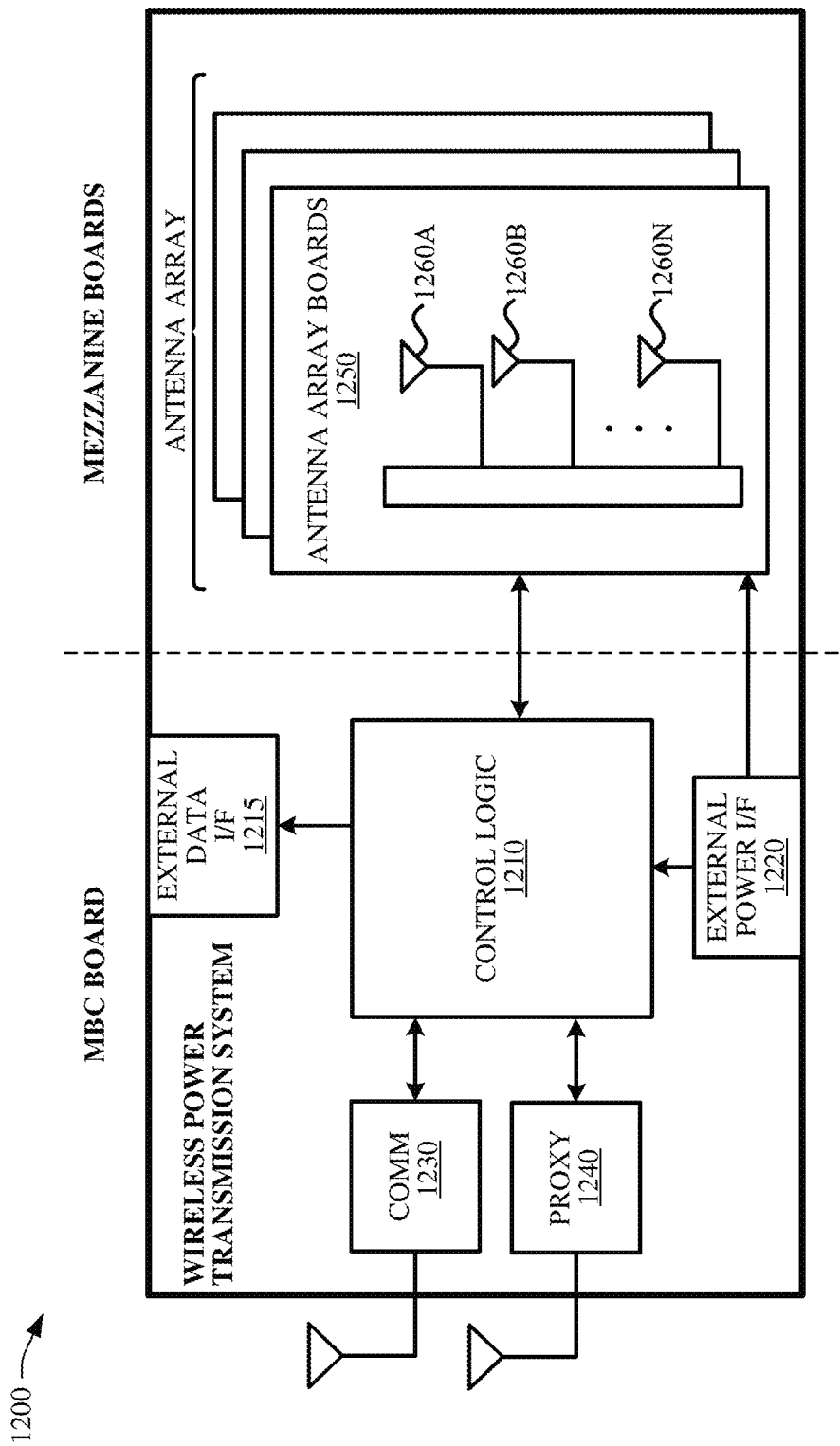
FIG. 12 depicts a block diagram illustrating example components of a wireless power transmission system, in accordance with various example embodiments of the subject matter disclosed herein.

FIG. 12 depicts a block diagram illustrating example components of a wireless power transmission system 1200, in accordance with an embodiment. As illustrated in the example of FIG. 12, the wireless power transmission system 1200 includes a master bus controller (MBC) board and multiple mezzanine boards that collectively comprise the antenna array. It should be appreciated that in other embodiment(s) (not shown), the wireless power transmission system 1200 can be communicatively coupled other such components, e.g., in addition to, or in lieu of, being communicatively coupled to the antenna array via the multiple mezzanine boards.

The MBC includes control logic 1210, an external data interface (I/F) 1215, an external power interface (I/F) 1220, a communication block 1230 and proxy 1240. The mezzanine boards (or antenna array boards 1250) each include multiple antennas 1260a-1260n. Some or all of the components can be omitted in some embodiments. Additional components are also possible. For example, in some embodiments only one of communication block 1230 or proxy 1240 may be included.

The control logic 1210 is configured to provide control and intelligence to the array components. The control logic 1210 may comprise one or more processors, FPGAs, memory units, etc., and direct and control the various data and power communications. The communication block 1230 can direct data communications on a data carrier frequency, such as the base signal clock for clock synchronization. The data communications can be Bluetooth™ WiFi™, ZigBee™, etc., including combinations or variations thereof. Likewise, the proxy 1240 can communicate with clients via data communications as discussed herein. The data communications can be, by way of example and not limitation, Bluetooth™, WiFi™, ZigBee™, etc. Other communication protocols are possible.

In some embodiments, the control logic 1210 can also facilitate and/or otherwise enable data aggregation for Internet of Things (IoT) devices. In some embodiments, wireless power receiver clients can access, track and/or otherwise obtain IoT information about the device in which the wireless power receiver client is embedded and provide that IoT information to the wireless power transmission system over a data connection. This IoT information can be provided to via an external data interface 1215 to a central or cloud-based system (not shown) where the data can be aggregated, processed, etc. For example, the central system can process the data to identify various trends across geographies, wireless power transmission systems, environments, devices, etc. In some embodiments, the aggregated data and or the trend data can be used to improve operation of the devices via remote updates, etc. Alternatively, or additionally, in some embodiments, the aggregated data can be provided to third party data consumers. In this manner, the wireless power transmission system acts as a Gateway or Enabler for the IoT devices. By way of example and not limitation, the IoT information can include capabilities of the device in which the wireless power receiver client is embedded, usage information of the device, power levels of the device, information obtained by the device or the wireless power receiver client itself, e.g., via sensors, etc.

The external power interface 1220 is configured to receive external power and provide the power to various components. In some embodiments, the external power interface 1220 may be configured to receive a standard external 24 Volt power supply. In other embodiments, the external power interface 1220 can be, for example, 110/240 Volt alternating current (AC) mains to an embedded direct current (DC) power supply that sources the required 11/24/48 Volt DC to provide the power to various components. Alternatively, the external power interface could be a DC power supply that sources the required 11/24/48 Volts DC. Alternative configurations are also possible.

In operation, the MBC, which controls the wireless power transmission system, receives power from a power source and is activated. The MBC then activates proxy antenna elements on the wireless power transmission system and the proxy antenna elements enter a default "discovery" mode to identify available wireless power receiver clients within range of the wireless power transmission system. When a client is found, the antenna elements on the wireless power transmission system power on, enumerate, and (optionally) calibrate.

The MBC then generates beacon transmission scheduling information and power transmission scheduling information during a scheduling process. The scheduling process includes selection of power receiver clients. For example, the MBC can select power receiver clients for power transmission and generate a BBS cycle and a Power Schedule (PS) for the selected wireless power receiver clients. As discussed herein, the power receiver clients can be selected based on their corresponding properties and/or requirements.

In some embodiments, the MBC can also identify and/or otherwise select available clients that will have their status queried in the Client Query Table (CQT). Clients that are placed in the CQT are those on "standby", e.g., not receiving a charge. The BBS and PS are calculated based on vital information about the clients such as, for example, battery status, current activity/usage, how much longer the client has until it runs out of power, priority in terms of usage, etc.

The Proxy Antenna Element (AE) broadcasts the BBS to all clients. As discussed herein, the BBS indicates when each client should send a beacon. Likewise, the PS indicates when and to which clients the array should send power to and when clients should listen for wireless power. Each client starts broadcasting its beacon and receiving power from the array per the BBS and PS. The Proxy AE can concurrently query the Client Query Table to check the status of other available clients. In some embodiments, a client can only exist in the BBS or the CQT (e.g., waitlist), but not in both. The information collected in the previous step continuously and/or periodically updates the BBS cycle and/or the PS.

Figure 13:
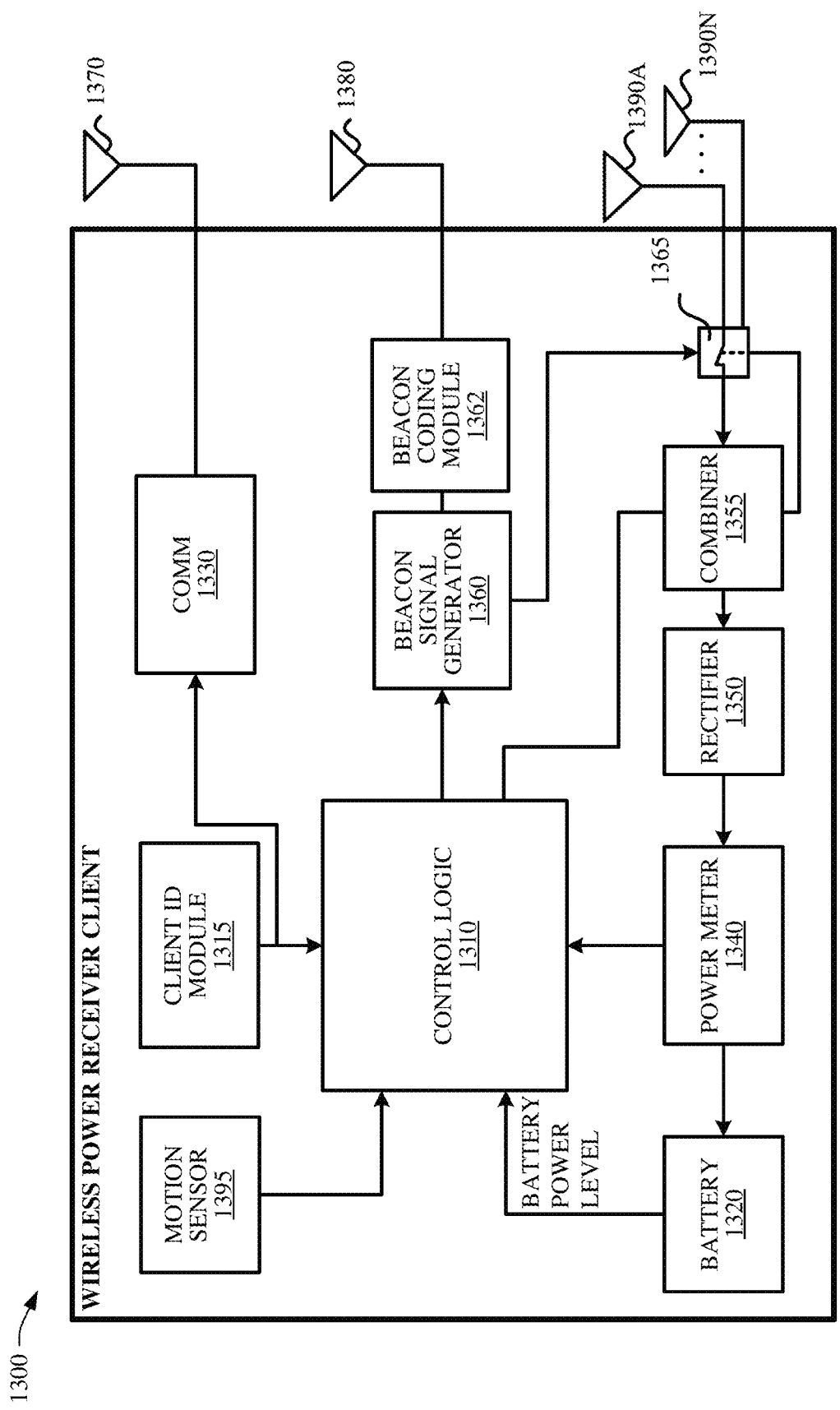
FIG. 13 depicts a block diagram illustrating example components of a wireless power receiver client, in accordance with various example embodiments of the subject matter disclosed herein.

FIG. 13 is a block diagram illustrating example components of a wireless power receiver client 1300, in accordance with some embodiments. As illustrated in the example of FIG. 13, the wireless power receiver client 1300 includes control logic 1310, battery 1320, an IoT control module 1325, communication block 1330 and associated antenna 1370, power meter 1340, rectifier 1350, a combiner 1355, beacon signal generator 1360, beacon coding unit 1362 and an associated antenna 1380, and switch 1365 connecting the rectifier 1350 or the beacon signal generator 1360 to one or more associated antennas 1390a-n. Some or all of the components can be omitted in some embodiments. For example, in some embodiments, the wireless power receiver client 1300 does not include its own antennas but instead utilizes and/or otherwise shares one or more antennas (e.g., Wi-Fi_33 antenna) of the wireless device in which the wireless power receiver client is embedded. Moreover, in some embodiments, the wireless power receiver client may include a single antenna that provides data transmission functionality as well as power/data reception functionality. Additional components are also possible.

A combiner 1355 receives and combines the received power transmission signals from the power transmitter in the event that the receiver 1300 has more than one antenna. The combiner can be any combiner or divider circuit that is configured to achieve isolation between the output ports while maintaining a matched condition. For example, the combiner 1355 can be a Wilkinson Power Divider circuit. The rectifier 1350 receives the combined power transmission signal from the combiner 1355, if present, which is fed through the power meter 1340 to the battery 1320 for charging. In other embodiments, each antenna's power path can have its own rectifier 1350 and the DC power out of the rectifiers is combined prior to feeding the power meter 1340. The power meter 1340 can measure the received power signal strength and provides the control logic 1310 with this measurement.

Battery 1320 can include protection circuitry and/or monitoring functions. Additionally, the battery 1320 can include one or more features, including, but not limited to, current limiting, temperature protection, over/under voltage alerts and protection, and coulomb monitoring.

The control logic 1310 receives and processes the battery power level from the battery 1320 itself. The control logic 1310 may also transmit/receive via the communication block 1330 a data signal on a data carrier frequency, such as the base signal clock for clock synchronization. The beacon signal generator 1360 generates the beacon signal, or calibration signal, transmits the beacon signal using either the antenna 1380 or 1390 after the beacon signal is encoded.

It may be noted that, although the battery 1320 is shown as charged by, and providing power to, the wireless power receiver client 1300, the receiver may also receive its power directly from the rectifier 1350. This may be in addition to the rectifier 1350 providing charging current to the battery 1320, or in lieu of providing charging. Also, it may be noted that the use of multiple antennas is one example of implementation and the structure may be reduced to one shared antenna.

In some embodiments, the control logic 1310 and/or the IoT control module 1325 can communicate with and/or otherwise derive IoT information from the device in which the wireless power receiver client 1300 is embedded. Although not shown, in some embodiments, the wireless power receiver client 1300 can have one or more data connections (wired or wireless) with the device in which the wireless power receiver client 1300 is embedded over which IoT information can be obtained. Alternatively, or additionally, IoT information can be determined and/or inferred by the wireless power receiver client 1300, e.g., via one or more sensors. As discussed above, the IoT information can include, but is not limited to, information about the capabilities of the device in which the wireless power receiver client 1300 is embedded, usage information of the device in which the wireless power receiver client 1300 is embedded, power levels of the battery or batteries of the device in which the wireless power receiver client 1300 is embedded, and/or information obtained or inferred by the device in which the wireless power receiver client is embedded or the wireless power receiver client itself, e.g., via sensors, etc.

In some embodiments, a client identifier (ID) module 1315 stores a client ID that can uniquely identify the wireless power receiver client 1300 in a wireless power delivery environment. For example, the ID can be transmitted to one or more wireless power transmission systems when communication is established. In some embodiments, wireless power receiver clients may also be able to receive and identify other wireless power receiver clients in a wireless power delivery environment based on the client ID.

An optional motion sensor 1395 can detect motion and signal the control logic 1310 to act accordingly. For example, a device receiving power may integrate motion detection mechanisms such as accelerometers or equivalent mechanisms to detect motion. Once the device detects that it is in motion, it may be assumed that it is being handled by a user, and would trigger a signal to the array to either to stop transmitting power, or to lower the power transmitted to the device. In some embodiments, when a device is used in a moving environment like a car, train or plane, the power might only be transmitted intermittently or at a reduced level unless the device is critically low on power.

Figure 14A:
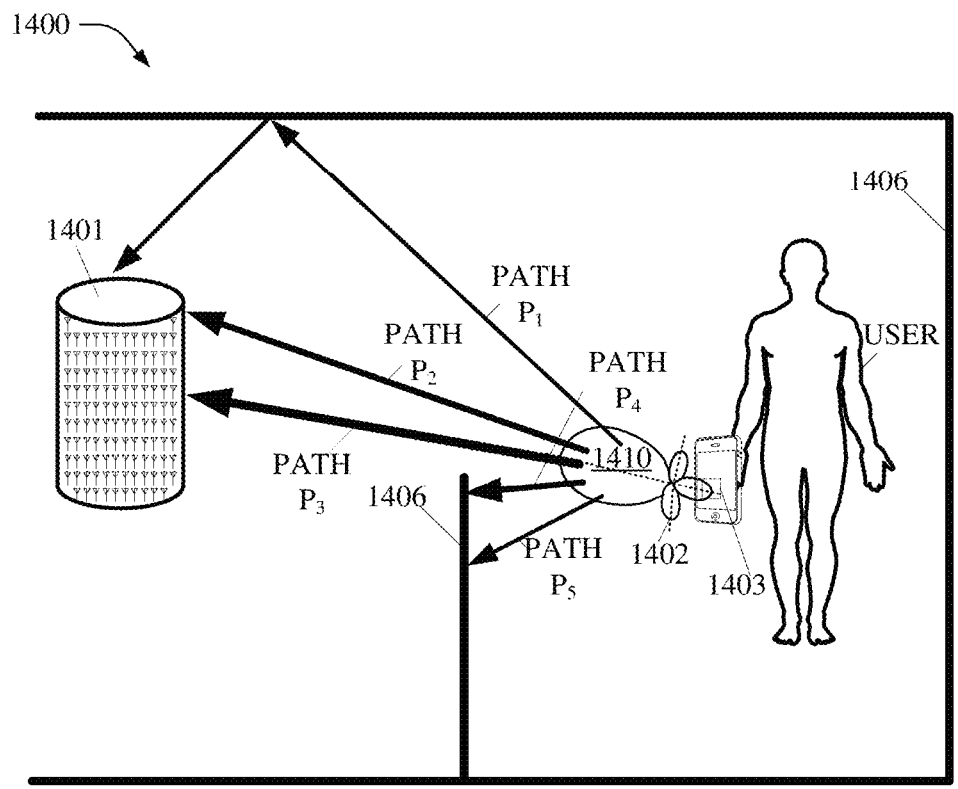
FIGS. 14A and 14B depict block diagrams illustrating example multipath wireless power delivery environments, in accordance with various example embodiments of the subject matter disclosed herein.
Figure 14B:
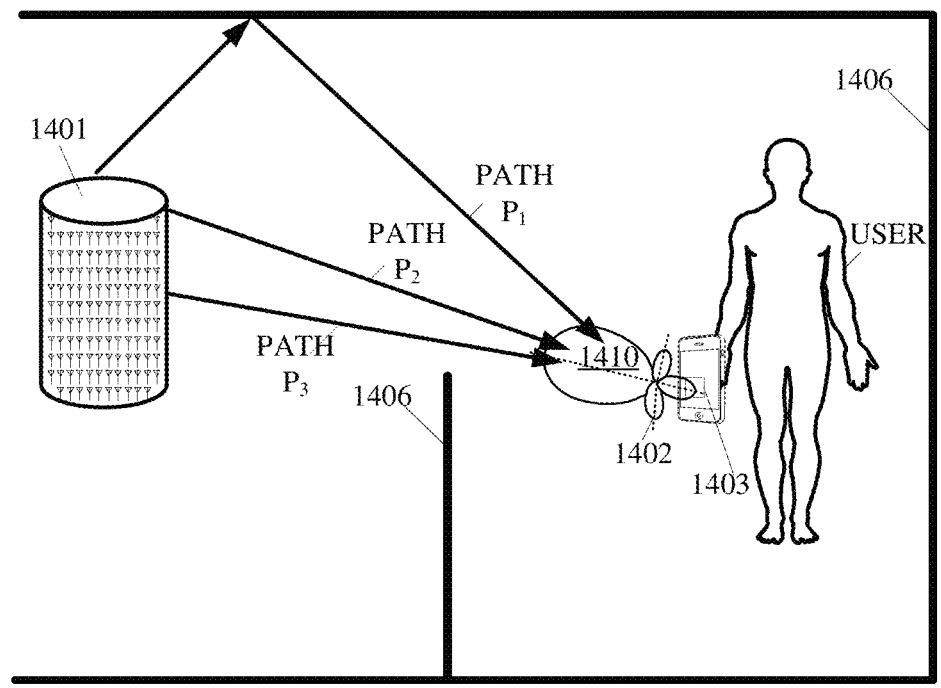

FIGS. 14A and 14B depict diagrams illustrating an example multipath wireless power delivery environment 1400, according to some embodiments. The multipath wireless power delivery environment 1400 includes a user operating a wireless device (e.g., 510, 1402, etc.) including one or more wireless power receiver clients (e.g., 1403). The wireless device 1402 can be wireless device as described herein, and the one or more wireless power receiver clients 1403 can be a wireless power receiver client 1300, although alternative configurations are possible. Likewise, wireless power transmission system 1401 can be any of those depicted and/or described herein, for example, although alternative configurations are possible. The multipath wireless power delivery environment 1400 includes reflective objects 1406 and various absorptive objects, e.g., users, or humans, furniture, etc.

Wireless device 1402 includes one or more antennas (or transceivers) that have a radiation and reception pattern 1410 in three-dimensional space proximate to the wireless device 1402. The one or more antennas (or transceivers) can be wholly or partially included as part of the wireless device 1402 and/or the wireless power receiver client (not shown). For example, in some embodiments one or more antennas, e.g., Wi-Fi_33, Bluetooth, etc. of the wireless device 1402 can be utilized and/or otherwise shared for wireless power reception. As shown in the examples of FIGS. 14A and 14B, the radiation and reception pattern 1410 comprises a lobe pattern with a primary lobe and multiple side lobes. Other patterns are also possible.

The wireless device 1402 transmits a beacon (or calibration) signal over multiple paths to the wireless power transmission system 1401. As discussed herein, the wireless device 1402 transmits the beacon in the direction of the radiation and reception pattern 1410 such that the strength of the received beacon signal by the wireless power transmission system, e.g., received signal strength indication (RSSI), depends on the radiation and reception pattern 1410. For example, beacon signals are not transmitted where there are nulls in the radiation and reception pattern 1410 and beacon signals are the strongest at the peaks in the radiation and reception pattern 1410, e.g., peak of the primary lobe. As shown in the example of FIG. 14A, the wireless device 1402 transmits beacon signals over five paths P1-P5. Paths P4 and P5 are blocked by reflective and/or absorptive object 1406. The wireless power transmission system 1401 receives beacon signals of increasing strengths via paths P1-P3. The bolder lines indicate stronger signals. In some embodiments, the beacon signals are directionally transmitted in this manner, for example, to avoid unnecessary RF energy exposure to the user.

A fundamental property of antennas is that the receiving pattern (sensitivity as a function of direction) of an antenna when used for receiving is identical to the far-field radiation pattern of the antenna when used for transmitting. This is a consequence of the reciprocity theorem in electromagnetism. As shown in the example of FIGS. 14A and 14B, the radiation and reception pattern 1410 is a three-dimensional lobe shape. However, the radiation and reception pattern 1410 can be any number of shapes depending on the type or types, e.g., horn antennas, simple vertical antenna, etc. used in the antenna design. For example, the radiation and reception pattern 1410 can comprise various directive patterns. Any number of different antenna radiation and reception patterns are possible for each of multiple client devices in a wireless power delivery environment.

Referring again to FIG. 14A, the wireless power transmission system 1401 receives the beacon (or calibration) signal via multiple paths P1-P3 at multiple antennas or transceivers. As shown, paths P2 and P3 are direct line of sight paths while path P1 is a non-line of sight path. Once the beacon (or calibration) signal is received by the wireless power transmission system 1401, the power transmission system 1401 processes the beacon (or calibration) signal to determine one or more receive characteristics of the beacon signal at each of the multiple antennas. For example, among other operations, the wireless power transmission system 1401 can measure the phases at which the beacon signal is received at each of the multiple antennas or transceivers.

The wireless power transmission system 1401 processes the one or more receive characteristics of the beacon signal at each of the multiple antennas to determine or measure one or more wireless power transmit characteristics for each of the multiple RF transceivers based on the one or more receive characteristics of the beacon (or calibration) signal as measured at the corresponding antenna or transceiver. By way of example and not limitation, the wireless power transmit characteristics can include phase settings for each antenna or transceiver, transmission power settings, etc.

As discussed herein, the wireless power transmission system 1401 determines the wireless power transmit characteristics such that, once the antennas or transceivers are configured, the multiple antennas or transceivers are operable to transit a wireless power signal that matches the client radiation and reception pattern in the three-dimensional space proximate to the client device. FIG. 14B illustrates the wireless power transmission system 1401 transmitting wireless power via paths P1-P3 to the wireless device 1402. Advantageously, as discussed herein, the wireless power signal matches the client radiation and reception pattern 1410 in the three-dimensional space proximate to the client device. Said another way, the wireless power transmission system will transmit the wireless power signals in the direction in which the wireless power receiver has maximum gain, e.g., will receive the most wireless power. As a result, no signals are sent in directions in which the wireless power receiver cannot receive power, e.g., nulls and blockages. In some embodiments, the wireless power transmission system 1401 measures the RSSI of the received beacon signal and if the beacon is less than a threshold value, the wireless power transmission system will not send wireless power over that path.

The three paths shown in the examples of FIGS. 14A and 14B are illustrated for simplicity, it is appreciated that any number of paths can be utilized for transmitting power to the wireless device 1402 depending on, among other factors, reflective and absorptive objects in the wireless power delivery environment. Although the example of FIG. 14A illustrates transmitting a beacon (or calibration) signal in the direction of the radiation and reception pattern 1410, it is appreciated that, in some embodiments, beacon signals can alternatively or additionally be omni-directionally transmitted.

Figure 15:
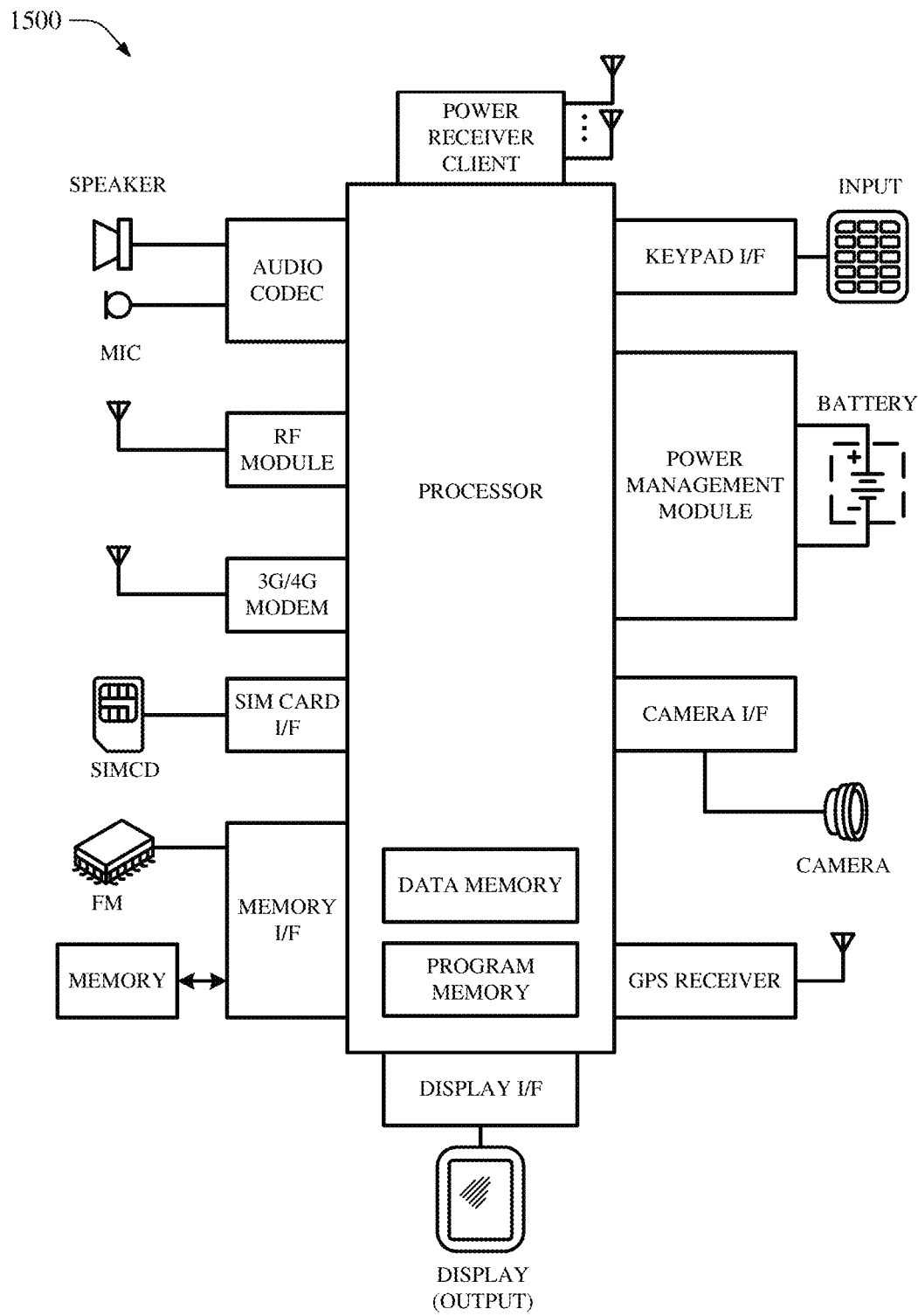
FIG. 15 depicts a block diagram illustrating example components of a representative mobile device or tablet computer with a wireless power receiver or client in the form of a mobile (or smart) phone or tablet computer device, in accordance with various example embodiments of the subject matter disclosed herein.

FIG. 15 depicts a block diagram illustrating example components of a representative mobile device (e.g., 510) or tablet computer 1500 with a wireless power receiver or client in the form of a mobile (or smart) phone or tablet computer device, according to an embodiment. Various interfaces and modules are shown with reference to FIG. 15, however, the mobile device or tablet computer does not require all of modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZigBee radios and RF identification (RFID) transceivers, along with antennas, can populate a PCB.

The wireless power receiver client can be a power receiver client 1503 of FIG. 15, although alternative configurations are possible. Additionally, the wireless power receiver client can include one or more RF antennas for reception of power and/or data signals from a charger, e.g., WPTS 1501 of FIG. 15.

Figure 16:
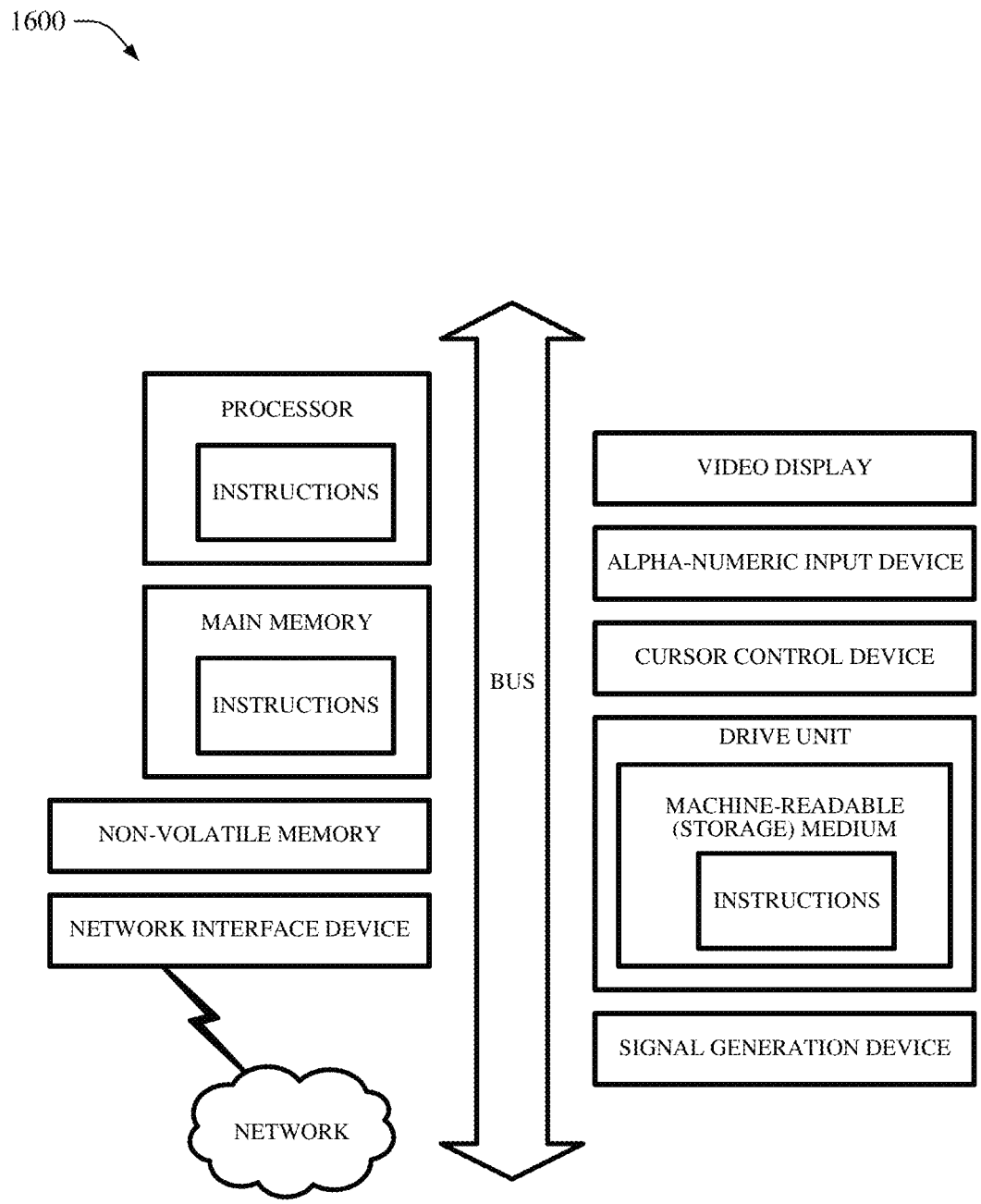
FIG. 16 depicts a diagrammatic representation of a machine, in an example form, of a computer system within which a set of instructions, for causing the machine to perform any one or more of the methodologies discussed herein, may be executed, in accordance with various example embodiments of the subject matter disclosed herein.

FIG. 16 depicts a diagrammatic representation of a machine, in the example form, of a computer system within which a set of instructions, for causing the machine to perform any one or more of the methodologies discussed herein, may be executed.

In the example of FIG. 16, the computer system includes a processor, memory, non-volatile memory, and an interface device. Various common components (e.g., cache memory) are omitted for illustrative simplicity. The computer system 1600 is intended to illustrate a hardware device on which any of the components depicted, e.g., in FIG. 1, FIG. 15, etc. (and any other components described in this specification) can be implemented. For example, the computer system can be any radiating object or antenna array system. The computer system can be of any applicable known or convenient type. The components of the computer system can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a compact disk ROM (CD-ROM), electrically programmable ROM (EPROM), or electrically erasable ROM (EEPROM), a magnetic or optical card, or another form of storage for large amounts of data. Some of this data is often written, by a direct memory access process, into memory during execution of software in the computer 1600. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, an integrated services digital network (ISDN) modem, cable modem, token ring interface, satellite transmission interface (e.g. "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 16 reside in the interface.

In operation, the computer system 1600 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

As it employed in the subject specification, the term "processing component" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processing component can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. A processing component can exploit nano-scale architectures such as, but not limited to, molecular and quantum-dot based transistors, switches and gates, in order to optimize space usage or enhance performance of components described herein. Further, a processing component can also be implemented as a combination of computing processing units.

In the subject specification, term "memory component" and substantially any other information storage component relevant to operation and functionality of a component and/or process described herein, refer to entities embodied in a "memory," or components comprising the memory. It will be appreciated that a memory component described herein can be either volatile memory or nonvolatile memory, or can include both volatile and nonvolatile memory.

By way of illustration, and not limitation, nonvolatile memory, for example, can be included in ROM, programmable ROM (PROM), EPROM, EPROM, or flash memory. Volatile memory can include RAM, which acts as external cache memory. By way of illustration and not limitation, RAM is available in many forms such as SRAM, DRAM, synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Further, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "connected," "coupled," or any variant thereof, means any connection or coupling, either direct or indirect, between two or more elements; the coupling of connection between the elements can be physical, logical, or a combination thereof. Where context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
transmitting, by a system comprising a processor, first signals in a first operation via a first transmission group of transmitting antennas to a first receiving antenna of an antenna array, the first signals being received at the first receiving antenna to obtain first phase information;
selecting, by the system, a second transmission group of transmitting antennas that is different from the first transmission group;
transmitting, by the system, second signals in a second operation via the second transmission group of transmitting antennas to a second receiving antenna of the antenna array, the second signals being received at the second receiving antenna to obtain second phase information;
inputting, by the system, phase information comprising the first phase information and the second phase information into a neural network framework; and
in response to the inputting of the first phase information and the second phase information into the neural network, obtaining distance information representative of a distance from a wireless power transmitter to an object as output from the neural network framework.

2. The method of claim 1, wherein the obtaining of the distance information representative of the distance from the wireless power transmitter to the object comprises obtaining the distance information representative of the distance from the wireless power transmitter to the object in a sensed environment.

3. The method of claim 1, wherein the distance information is first distance information, wherein the distance is a first distance, and wherein the obtaining of the first distance information comprises obtaining second distance information representative of a second distance from the wireless power transmitter to a wireless power receiver.

4. The method of claim 1, wherein the distance information is first distance information, wherein the distance is a first distance, and wherein the obtaining of the first distance information comprises obtaining reflected distance information representative of a second distance from the wireless power transmitter to the object and back to a wireless receiver that is adjacent the wireless power transmitter.

5. The method of claim 1, further comprising;
modifying, by the system, power of a subsequent wireless power transmission based on the distance information.

6. The method of claim 1, further comprising;
mapping, by the system, an environment comprising the object based on the distance information.

7. The method of claim 1, further comprising;
obtaining, by the system, signal strength information corresponding to the wireless power transmission, and using the signal strength information to verify the distance information.

8. The method of claim 1, further comprising;
training, by the system, the neural network framework using supervised learning.

9. A system, comprising:
a processor; and
a memory that stores executable instructions that, when executed by the processor, facilitate performance of operations, comprising:
transmitting, via a first operation using a first transmission group of transmitting antennas, first signals to a first receiving antenna of an antenna array to facilitate generation of first phase information;
transmitting, via a second operation using a second transmission group of transmitting antennas, second signals to a second receiving antenna of the antenna array to facilitate generation of second phase information, wherein the second transmission group is different from the first transmission group; and
in response to sending the first phase information and the second phase information to a neural network framework, receiving, from the neural network framework, distance information representative of a distance from a wireless power transmitter to an object.

10. The system of claim 9, wherein the receiving of the distance information comprises:
obtaining the distance information in a sensed environment.

11. The system of claim 9, wherein the distance information is first distance information, wherein the distance is a first distance, and wherein obtaining the first distance information comprises:
obtaining second distance information representative of a second distance from the wireless power transmitter to a wireless power receiver.

12. The system of claim 9, wherein the distance information is first distance information, wherein the distance is a first distance, and wherein obtaining the first distance information comprises:
obtaining reflected distance information representative of a second distance, from the wireless power transmitter to the object, and back to a wireless receiver that is adjacent the wireless power transmitter.

13. The system of claim 9, wherein the operations further comprise:
modifying power of a subsequent wireless power transmission based on the distance information.

14. The system of claim 9, wherein the operations further comprise:
mapping an environment comprising the object based on the distance information.

15. The system of claim 9, wherein the operations further comprise:
obtaining signal strength information corresponding to the wireless power transmission; and
based on the signal strength information, verifying the distance information.

16. The system of claim 9, wherein the operations further comprise:
training the neural network framework using supervised learning.

17. A non-transitory machine-readable storage medium comprising instructions that, in response to execution, cause a system comprising a processor to perform operations, comprising:
transmitting, to a first receiving antenna of an antenna array, first signals in a first operation via a first transmission group of transmitting antennas to obtain first phase information;
transmitting, to a second receiving antenna of the antenna array, second signals in a second operation via a second transmission group of transmitting antennas to obtain second phase information, wherein the second transmission group is different from the first transmission group;
inputting the first phase information and the second phase information into a neural network framework; and
based on the first phase information and the second phase information that was input to the neural network, obtaining distance information representative of a distance from a wireless power transmitter to an object as output from the neural network framework.

18. The non-transitory machine-readable storage medium of claim 17, wherein the operations further comprise:
modifying power of a subsequent wireless power transmission based on the distance information.

19. The non-transitory machine-readable storage medium of claim 17, wherein the operations further comprise:
mapping an environment comprising the object based on the distance information.

20. The non-transitory machine-readable storage medium of claim 17, wherein the operations further comprise:
obtaining signal strength information corresponding to the wireless power transmission; and
based on the signal strength information, verifying the distance information.

\* \* \* \* \*